(12) United States Patent
Helm

(10) Patent No.: US 6,216,981 B1
(45) Date of Patent: Apr. 17, 2001

(54) ENVIRONMENTAL CONTROL SYSTEM

(75) Inventor: Hagen M Helm, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/246,846

(22) Filed: Feb. 9, 1999

(30) Foreign Application Priority Data

Mar. 6, 1998 (GB) ................................................ 9804784

(51) Int. Cl.$^7$ ................................................ B64D 13/06
(52) U.S. Cl. ........................................ 244/118.5; 454/76
(58) Field of Search ...................... 244/118.5, 53 R; 60/39.07, 39.142; 454/71, 74, 76

(56) References Cited

U.S. PATENT DOCUMENTS

| | | | |
|---|---|---|---|
| 2,809,714 | * 10/1957 | Sims, Jr. et al. | 96/372 |
| 2,937,011 | * 5/1960 | Brahm | 165/203 |
| 4,419,926 | 12/1983 | Cronin et al. | |
| 4,684,081 | * 8/1987 | Cronin | 244/118.5 X |
| 4,706,908 | 11/1987 | Huffman et al. | |
| 5,299,763 | * 4/1994 | Bescoby et al. | 244/118.5 |
| 5,967,461 | * 10/1999 | Farrington | 244/118.5 |
| 6,127,758 | * 10/2000 | Murry et al. | 244/53 R X |

FOREIGN PATENT DOCUMENTS 1316275 5/1973 (GB) .

* cited by examiner

Primary Examiner—Robert P. Swiatek
(74) Attorney, Agent, or Firm—W. Warren Taltavull; Manelli, Denison & Selte PLLC

(57) ABSTRACT

An environmental control system which is particularly suitable for use in aircraft comprises an air compressor (22) and an expansion turbine (36). The air compressor (22) is electrically driven at its optimum speed to deliver compressed air to the turbine (36). The compressed air expands through the turbine (36), thereby reducing in temperature as it drives the turbine (36). An electrical generator (44) is driven by the turbine (36). A condenser (33) is provided to condense water vapor in the air exhausted from the compressor (22).

15 Claims, 2 Drawing Sheets

ENVIRONMENTAL CONTROL SYSTEM

FIELD OF THE INVENTION

This invention relates to an environmental control system an in particular to an environmental control system suitable for use in a vehicle such as an aircraft.

BACKGROUND OF THE INVENTION

Conventionally, an aircraft is provided with an environmental control system in which air is taken from the compressor of one or more of its engines and is cooled and dried before being mixed with recirculated cabin air. The air mixture is then supplied to the aircraft cabin. Temperature adjustments are made to the air by mixing it with warm air taken from the engine or engines.

Such environmental control systems are effective in the provision of an acceptable aircraft cabin atmosphere. However, they do have drawbacks in that taking air from the engine's compressor has a detrimental effect upon overall engine operating efficiency and large amounts of ducting are required to direct the air around the aircraft.

A way of avoiding the drawbacks of such environmental control systems is disclosed in U.S. Pat. No. 4,546,939. In U.S. Pat. No. 4,546,939, an aircraft environmental control system is described which takes no air from the aircraft's engines. Instead, electrical power derived from the engine, or alternatively from a ground supply when the aircraft is parked, is used to drive a compressor which compresses ambient air. Air from the compressor is directed through a heat exchanger to cool it before entering a turbine through which it expands to provide further cooling and water vapour condensation. The cooled air is then passed through a further heat exchanger before being directed into the aircraft's cabin.

In the system of U.S. Pat. No. 4,546,939, the compressor and turbine are mechanically interconnected. This, unfortunately, has an adverse effect upon overall operating efficiency.

It is an object of the present invention to provide an environmental control system in which the above-mentioned drawbacks are substantially avoided.

SUMMARY OF THE INVENTION

According to the present invention, an environmental control system comprises an air compressor, an electric motor to drive said air compressor, an electrical power control and distribution system to receive electrical power and to direct at least some of that electrical power to drive said electric motor, a turbine to receive and expand air delivered thereto by said compressor to thereby cool said air, an electrical generator driven by said turbine, said electrical generator providing at least some of the electrical power received by said electrical power control system, and a water separator to remove water from air exhausted from said compressor.

A first heat exchanger is preferably provided downstream of said compressor to reduce the temperature of air exhausted from said compressor.

Said first heat exchanger may be positioned to place air exhausted from said compressor in heat exchange relationship with a flow of ambient air.

Water, which is in operation removed by said water separator from air exhausted from said turbine, may be directed into said flow of ambient air upstream of said first heat exchanger.

A second heat exchanger may be provided downstream of said first heat exchanger, said second heat exchanger being adapted to put air exhausted from said first heat exchanger in heat exchange relationship with air exhausted from said water separator.

A condenser is preferably provided to place air exhausted from said second heat exchanger in heat exchange relationship with air exhausted from said turbine.

Preferably heating means are provided downstream of said turbine to increase the temperature of air exhausted from said turbine to a temperature sufficiently high to prevent the formation of ice in said air.

Said heating means may be an electrical heater powered by said electrical power control and distribution system.

Alternatively, said heating means may comprise a discrete flow of air exhausted from and heated by its passage through said compressor.

Said air exhausted from said turbine is preferably heated electrically to the temperature required of air constituting the output from said system.

Said system may be adapted to control the environment of the interior of an aircraft.

Said electrical power is at least partially derived from generators powered by the propulsion engines of said aircraft.

Since the compressor and turbine of the environmental control system are not mechanically interconnected, they are able to operate at their optimum speeds.

BRIEF DESCRIPTION OF THE DRAWINGS

The present invention will now be described, by way of example, with reference to the accompanying drawings in which:

With reference to FIG. 1, an aircraft generally indicated at 10 is powered by two ducted fan gas turbine engines 11 and 12 and is provided with two similar air conditioning units 13 and 14. Each of the engines 11 and 12 is provided with an electrical motor/generator, preferably of the samarium/cobalt type, which deliver electrical power to an electrical control and distribution unit 15. The control and distribution unit 15 conditions that electrical power and distributes it to a number of sources including a general line 16 out to the aircraft's various systems and a further line 17 to provide electrical de-icing of appropriate regions of the exterior of the aircraft 10.

When the engines 11 and 12 are not operating, electrical power is derived from either an auxiliary power unit 10a or other suitable power source mounted aboard the aircraft 10 or alternatively, from a ground based source.

Figure 2:
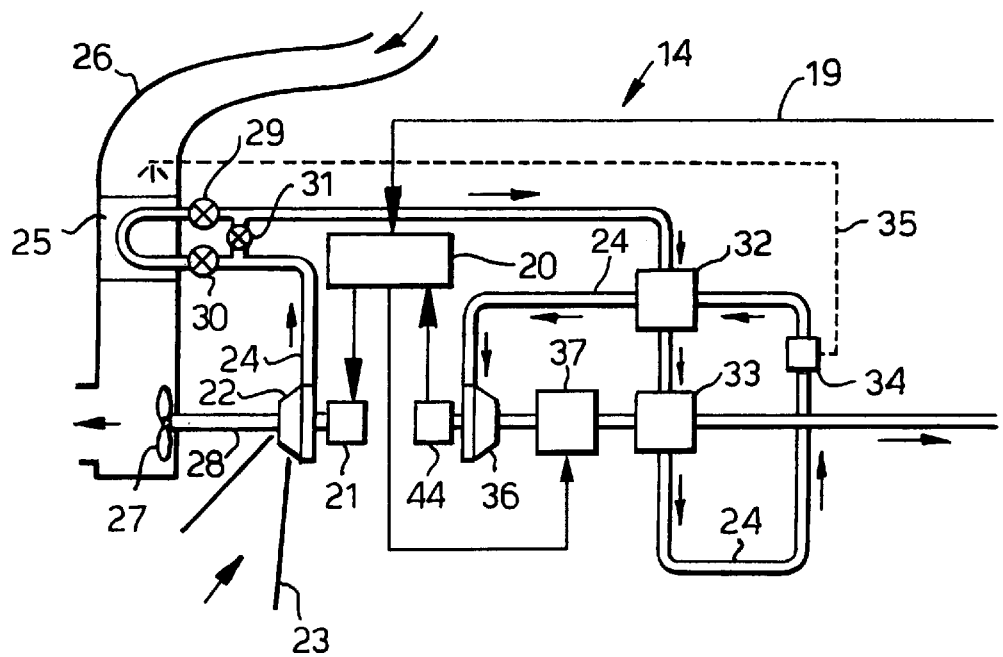
FIG. 2 is a view, on an enlarged scale, of a part of the environmental control system of the aircraft shown in FIG. 1.

Electrical power is also directed from the control and distribution unit 15 through lines 18 and 19 to the air conditioning units 13 and 14 respectively. Since, as stated earlier, the air conditioning units 13 and 14 are similar, they will be described with reference to the unit 14 only which is shown in more detail in FIG. 2.

Power through the line 19 is directed to a local control unit 20 which in turn directs that power to an electric motor 21. The motor 21 drives a centrifugal compressor 22 which draws in ambient air through an intake 23. That air is compressed by the compressor 22 before being exhausted into a duct 24. That duct 24 passes through a first heat exchanger 25 which is positioned in a passage 26 through which flows ambient ram air. That ram air flow is assisted by an impeller 27 which is driven by the compressor 22 via a shaft 28.

The ambient ram air flow through the passage 26 serves to cool down the air in the duct 24 from the temperatures it reached as a result of being compressed by the compressor 22. There may be circumstances, however, in which such cooling is not necessary. In order to accommodate this eventuality, valves 29 and 30 are provided in the duct 24 to isolate the first heat exchanger 25, and a by-pass valve 31 is provided to enable the air flow to by-pass the heat exchanger 25.

The compressed air is then directed by the duct 24 into a second heat exchanger 32 where it loses some heat as will be described later. The cooled air then flows through a condenser 33 where its temperature is reduced to a level at which at least some of the water vapour in the air condenses to form water droplets. Those water droplets are then separated from the air flow by a water separator 34. The separated water is directed along the path indicated by the interrupted line 35 to be exhausted into the passage 26. There it mixes with the ram air flow through the passage 26 thereby improving the efficiency of the first heat exchanger 25.

Figure 1:
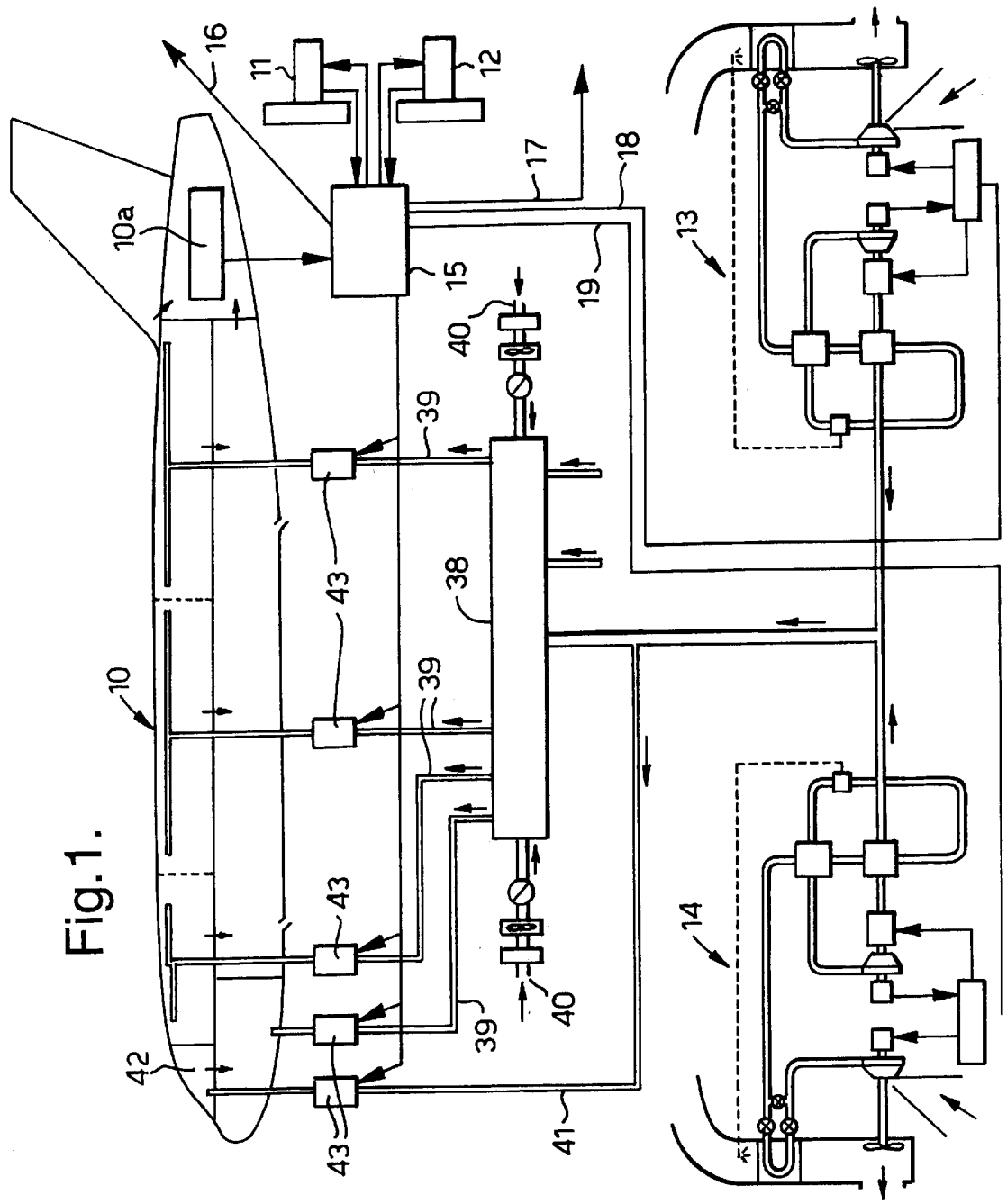
FIG. 1 is a diagrammatic representation of an aircraft provided with an environmental control system in accordance with the present invention.

The resultant dry air then passes through the second heat exchanger 32 where it is warmed by its heat exchange with the air exhausted from the compressor 22 whereupon it is directed by the duct 24 into the inlet of a centrifugal turbine 36. The warm air expands through, and thereby drives, the turbine 36. In doing so, its temperature decreases to the extent that any water remaining in the air may freeze. In order to melt any ice that does so form, an electrical heater 37 powered from the local control unit 20 is provided immediately downstream of the turbine 36. The cooled air is then directed through condenser 33 where it serves to cool the earlier airflow as described above before being exhausted into a mixing manifold 38 that can be seen if reference is now made back to FIG. 1.

The mixing manifold 38 receives cool, dried air from the air conditioning units 13 and 14 and mixes it with recirculated air through inlets 40 from the cabin of the aircraft 10. The air mixture is the directed through various ducts 39 which distribute the air throughout the interior of the aircraft 10. A single duct 41 by-passes the mixing manifold 38 to provide an air supply to the aircraft cockpit 42 which does not contain recirculated cabin air.

In order to provide a final adjustment of the temperature of the air flowing into interior of the aircraft, electric heaters 42 are provided in supply ducts 39 and 41. The heaters 43 are provided with electrical power by the control and distribution unit 15.

Referring back to FIG. 2, the turbine 36 drives an electrical generator 44. The electrical energy generated by the generator 44 is directed into the local control unit 20 from where it is redirected to the control and distribution unit 15. There the generated electrical power from the turbine 36 is utilised in the most effective manner. Consequently, at least some of the generated electrical power is used to provide power for the electric motors 21 driving the compressors 22.

Figure 3:
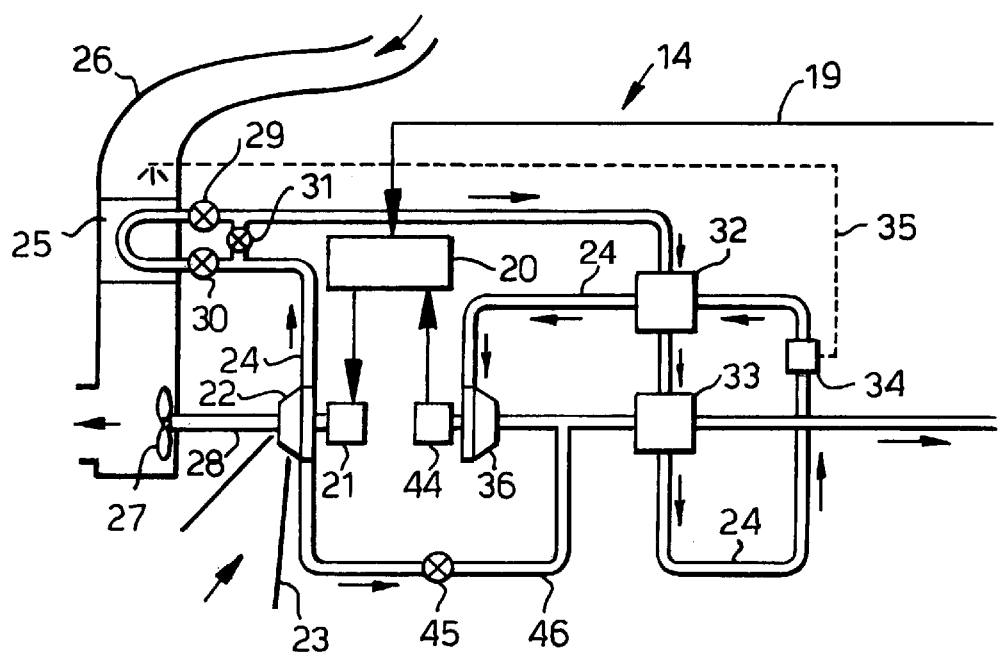
FIG. 3 is a view, similar to that shown in FIG. 2, showing an alternative embodiment of the present invention.

In an alternative embodiment of the present invention shown in FIG. 3, the air conditioning unit 14 is modified by the deletion of the electrical heater 37 at the outlet of the turbine 36. In its place, an additional duct 46 is provided at the outlet of the compressor 22. The duct 46, which includes a flow modulation valve 45, directs a portion of the warm air exhausted from the compressor into the cold air flow downstream of the turbine 36, thereby inhibiting the formation of ice at the outlet of the turbine 36.

It will be seen, therefore, that the compressor 22 and turbine 36 in each of the air conditioning units 13 and 14 are not mechanically interconnected. Consequently, they are able to rotate at their optimum speeds for the requirements of the aircraft 10. Additionally, the compressor 22 can be driven at such a speed that it provides its optimum characteristics. All of the power generated by the turbine driven generator 44 is utilised in the most effective manner within the environmental control system in accordance with the present invention. This it does totally independently of the compressor 22.

Since the compressor 22 and turbine 36 are not mechanically interconnected, they can be located within the aircraft 10 in such positions that they have an optimum effect upon aircraft dynamics. Moreover, the architecture of the system is such that it provides improved fault tolerance and facilitates advanced monitoring of system failures.

Although the present invention has been described with reference to an environmental control system for an aircraft, it will be appreciated that it could also be used on other vehicles such as trains, ships or battle tanks.

What is claimed is:

1. An environmental control system comprising an air compressor, an electric motor to drive said air compressor, an electrical power control and distribution system to receive electrical power and to direct at least some of that electrical power to drive said electric motor, a turbine to receive and expand air delivered thereto by said compressor to thereby cool said air, an electrical generator driven by said turbine, said electrical generator providing at least some of the electrical power received by said electrical power control system, and a water separator to remove water from air exhausted from said compressor.

2. An environmental control system as claimed in claim 1 wherein a first heat exchanger is provided downstream of said compressor to reduce the temperature of air exhausted from said compressor.

3. An environmental control system as claimed in claim 2 wherein said first heat exchanger is positioned to place air exhausted from said compressor in heat exchange relationship with a flow of ambient air.

4. An environmental control system as claimed in claim 1 wherein heating means are provided downstream of said turbine to increase the temperature of air exhausted from said turbine to a temperature sufficiently high to prevent the formation of ice in said air.

5. An environmental control system as claimed in claim 4 wherein said heating means is an electrical heater powered by said electrical power control and distribution system.

6. An environmental control system as claimed in claim 4 wherein said heating means comprises a discrete flow of air exhausted from and heated by its passage through said compressor.

7. An environmental control system as claimed in claim 1 wherein said air exhausted from said turbine is heated electrically to the temperature required of air constituting the output from said system.

8. An environmental control system as claimed in claim 1 wherein said system is adapted to control the environment of the interior of an aircraft.

9. An environmental control system as claimed in claim 8 wherein said electrical power is at least partially derived from generators powered by the propulsion engines of said aircraft.

10. An environmental control system as claimed in claim 9 wherein said aircraft is additionally provided with an independent, non-propulsive power unit to provide electrical power for said environmental control unit.

11. An environmental control system comprising an air compressor, an electric motor to drive said air compressor, an electrical power control and distribution system to receive electrical power and to direct at least some of that electrical power to drive said electric motor, a turbine to receive and expand air delivered thereto by said compressor to thereby cool said air, an electrical generator driven by said turbine, said electrical generator providing at least some of the electrical power received by said electrical power control system, and a water separator to remove water from air exhausted from said compressor, a first heat exchanger being provided downstream of said compressor to reduce the temperature of air exhausted from said compressor, said first heat exchanger being positioned to place air exhausted from said compressor in heat exchange relationship with a flow of ambient air, the water which in operation is removed by said water separator from air exhausted from said turbine being directed into said flow of ambient air upstream of said first heat exchanger.

12. An environmental control system comprising an air compressor, an electric motor to drive said air compressor, an electrical power control and distribution system to receive electrical power and to direct at least some of that electrical power to drive said electric motor, a turbine to receive and expand air delivered thereto by said compressor to thereby cool said air, an electrical generator driven by said turbine, said electrical generator providing at least some of the electrical power received by said electrical power control system, and a water separator to remove water from air exhausted from said compressor, a first heat exchanger being provided downstream of said compressor to reduce the temperature of air exhausted from said compressor, a second heat exchanger being provided downstream of said first heat exchanger, said second heat exchanger being adapted to put air exhausted from said first heat exchanger in heat exchange relationship with air exhausted from said water separator.

13. An environmental control system as claimed in claim 12 wherein a condenser is provided to place air exhausted from said second heat exchanger in heat exchange relationship with air exhausted from said turbine.

14. An environmental control system comprising an air compressor, an electric motor to drive said air compressor, an electrical power control and distribution system to receive electrical power and to direct at least some of that electrical power to drive said electric motor, a turbine to receive and expand air delivered thereto by said compressor to thereby cool said air, an electrical generator driven by said turbine, said electrical generator providing at least some of the electrical power received by said electrical power control system, and a water separator to remove water from air exhausted from said compressor, heating means being provided downstream of said turbine to increase the temperature of air exhausted from said turbine to a temperature sufficiently high to prevent the formation of ice in said air.

15. An environmental control system comprising an air compressor, an electric motor to drive said air compressor, an electrical power control and distribution system to receive electrical power and to direct at least some of that electrical power to drive said electric motor, a turbine to receive and expand air delivered thereto by said compressor to thereby cool said air, an electrical generator driven by said turbine, said electrical generator providing at least some of the electrical power received by said electrical power control system, and a water separator to remove water from air exhausted from said compressor, said air exhausted from said turbine being heated electrically to the temperature required of air constituting the output from said system.

* * * * *